United States Patent
Nowak et al.

(10) Patent No.: US 7,875,111 B2
(45) Date of Patent: Jan. 25, 2011

(54) ANTI-SKINNING COMPOSITION FOR OIL BASED COATING MATERIAL

(75) Inventors: Milton Nowak, New York, NY (US); Lilya Gurariy, North Bergen, NJ (US)

(73) Assignee: Troy Corporation, Florham Park, NJ (US)

( * ) Notice: Subject to any disclaimer, the term of this patent is extended or adjusted under 35 U.S.C. 154(b) by 0 days.

(21) Appl. No.: 12/380,856

(22) Filed: Mar. 4, 2009

(65) Prior Publication Data

US 2010/0224099 A1 Sep. 9, 2010

(51) Int. Cl.
*C09D 7/04* (2006.01)

(52) U.S. Cl. .................. 106/243; 106/287.24; 106/311; 106/316; 252/364; 516/113

(58) Field of Classification Search .................. 106/243, 106/311, 287.24, 316; 252/364; 516/113
See application file for complete search history.

(56) References Cited

U.S. PATENT DOCUMENTS

| | | | | |
|---|---|---|---|---|
| 4,191,728 A | * | 3/1980 | Tels et al. | 423/24 |
| 4,351,807 A | * | 9/1982 | Tels et al. | 423/24 |
| 5,130,402 A | | 7/1992 | Akiyama et al. | |
| 5,721,326 A | | 2/1998 | Frost | |
| 5,985,018 A | * | 11/1999 | Link et al. | 106/287.25 |
| 7,201,796 B2 | * | 4/2007 | Martyak et al. | 106/287.26 |
| 2001/0008932 A1 | | 7/2001 | Bakkeren et al. | |
| 2005/0165139 A1 | | 7/2005 | Kawakami et al. | |
| 2008/0250977 A1 | * | 10/2008 | Mason et al. | 106/287.3 |

FOREIGN PATENT DOCUMENTS

JP 63-215603 A * 9/1988

* cited by examiner

*Primary Examiner*—Anthony J Green
(74) *Attorney, Agent, or Firm*—Robert A. Yesukevich

(57) ABSTRACT

The invention provides anti-skinning compositions for use in manufacturing oil-based coating materials. The novel anti-skinning compositions are clear, homogeneous solutions of cyclohexanone oxime that can be prepared by dissolving cyclohexanone oxime in a suitable carboxylic acid or mixture of carboxylic acids. Suitable carboxylic acids include fatty acids, such as fatty acids of tall oil distillate. Surprisingly, the fatty acids are useful as delivery solvents over a useful range of temperatures and have desirable flash points. They are compatible with many oil-based coating materials. The anti-skinning compositions and manufacturing methods of the present invention are especially useful in the manufacture of oil-based paints containing metal carboxylate driers.

15 Claims, 2 Drawing Sheets

ANTI-SKINNING COMPOSITION FOR OIL BASED COATING MATERIAL

BACKGROUND OF THE INVENTION

1. Field of the Invention

The present invention involves novel vehicles for introducing one or more compounds of the oxime family into starting mixtures which can be utilized in the manufacture of coating materials.

2. Description of Related Art

The present invention relates to a concentrated solution of an anti-skinning agent in a suitable solvent. Anti-skinning agents are compounds that may be added to oil based coating materials, such as paints, stains and lacquers, to prevent the formation of skin or lumpy matter on the coating material as a result of oxidation during transportation or storage.

Compounds which have been used successfully as anti-skinning agents include phenols, substituted phenols, hydroquinones, polyphenols, dioxo-compounds, tin compounds, aliphatic amines and their salts, mixtures of organic hydroxylamines and β-dicarbonyl compounds or their derivatives, natural antioxidants such as (DL-α-tocopherol), and oximes. Oximes such as methyl ethyl ketoxime and butyl aldoxime have been particularly well received by the coating materials industry. These two widely accepted oximes compounds are liquids at room temperature and exhibit relatively high flash point temperatures. When these oxime compounds are employed as ant-skinning agents, they are typically utilized in essentially pure form.

While methyl ethyl oxime and butyl aldoxime are widely employed by industry, these particular oximes reportedly exhibit some degree of toxicity to humans. It appears likely that future use of these oximes will be regulated in various countries in order to protect public health. For example, the European Chemical Agency (ECHA) has announced its intention to restrict the future use of methyl ethyl oxime and butyl aldoxime in Europe under Regulation (EC) No. 1907/2006 concerning the Registration, Evaluation, Authorization and Registration of Chemicals (REACH). As another example, the Danish Environmental protection Agency has published regulations relating to the use of cobalt driers and methyl ethyl ketoxime. See Miljoprojekt, 884 2003. "Substitution of Cobalt driers and methyl ethyl ketoxime" at 6 Environ, Pages 1-12. However, it does not appear likely that all oximes will be restricted by REACH or similar regulations.

Another oxime, cyclohexanone oxime, has been used as an anti-skinning agent in relatively few applications. This is apparently due to the fact that cyclohexanone oxime is somewhat difficult to handle in pure form. Pure cyclohexanone oxime is a crystalline solid and subject to sintering at room temperature. Significant time and mixing energy is required to dissolve pure cyclohexanone oxime in liquid coating materials. In other respects, cyclohexanone oxime is an attractive candidate for use as an anti-skinning agent in oil-based coating materials.

Delivering a more concentrated cyclohexanone oxime solution, rather than a less concentrated cyclohexanone oxime solution, tends to reduce shipping costs and storage costs. For example, the savings associated with shipping and storing solutions including 20 mass percent cyclohexanone oxime or more are significant. Consequently, manufacturers of oil-based coating materials would welcome a delivery solvent that permits relatively concentrated cyclohexanone oxime solutions to be efficiently shipped, stored and employed with their products.

The solubility of cyclohexanone oxime in previously known delivery solvents is limited. Also, for safety reasons, solutions having relatively high flash point temperatures and relatively less Volatile Organic Carbon content ("VOC content") are favored by the industry. Even then, not all of the previously known solvents are compatible with use in oil based coating materials.

The stability and compatibility requirements associated with manufacturing oil-based paints are representative of requirements posed by the oil-based coatings industry in general. Oil-based paints typically contain unsaturated resins dissolved or dispersed in an organic medium that are intended to form a solid film on a substrate. These resins are initially present in the coating composition as liquids, or as particles dispersed in a liquid phase. Once the coating composition has been applied to a substrate, a polymerization reaction chemically converts the unsaturated resin into the solid film. The polymerization reaction is often called "drying", even when it is not associated with a loss of water. The polymerization reaction may be initiated by, for example, exposure to oxygen present in the surrounding atmosphere or radiant energy such as ultraviolet light. The mechanisms involved are described in a technical paper by K. U. Ingold entitled "Inhibition of the autoxidation of organic substances in the liquid phase", which was published Feb. 1, 1961 by the Division of Applied Chemistry, National Research Council, Ottawa, Ontario, Canada.

Alkyd resins are the dominant binder in many commercial paints and other oil-based coatings. Alkyd resins are produced by the reaction of polyols with carboxylic acids or anhydrides. To make them susceptible to the drying process, and to impart of a degree of flexibility to the resulting dry film, some alkyd resins are reacted with unsaturated triglycerides. Plant and vegetable oils, such as tung oil and linseed oil, are frequently the source of the triglycerides. In these drying alkyds, unsaturated alkene groups can react with oxygen from the air, causing the oils to crosslink, harden, and appear to dry. The length of time required for drying depends on the amount and type of drying oil employed, and the presence of organic metal salts, also known as "driers", which catalyze polymerization of the unsaturated oils.

The driers for oil-based coatings generally catalyze oxidative radical cross-linking of the oils to form three-dimensional polymer networks. Successful driers for oil-based coatings frequently include carboxylates of metals such as cobalt, magnesium, manganese, lead, zirconium, zinc, vanadium, calcium and iron. The carboxylate portion of the driers can be derived from, for example, 2-ethyl hexanoic acid, isononanic acid, heptanoic acid, versatic acid and linseed oil fatty acids. Driers commercially available from Troy Chemical Corporation of Florham Park, N.J. under the registered tradenames Troychem® or Troymax® exemplify these metal carboxylate driers.

Anti-skinning agents are frequently employed with driers in oil-based coatings to prevent skinning or lumpy material formation in the coating material during transportation and storage. In a typical manufacturing process for oil-based coatings, an anti-skinning agent, a drier, an oil-based solvent and, optionally, a pigment and well-known adjuvants are blended with a drying alkyd resin and stirred at a temperature below the fusion temperature of the alkyd resin. The resulting coating material is subsequently placed in a can, drum, tank, or other container for storage and/or transportation. The period of storage and/or shipment may last several months or more. As the containers are not generally temperature-controlled, their contents may be exposed to temperatures ranging from −8 to about 30 degrees C.

Solvents employed in the manufacture of cyclohexanone oxime reportedly include water; alcohols such as methyl alcohol, ethyl alcohol, n-propyl alcohol, isopropyl alcohol, n-butyl alcohol, sec-butyl alcohol, tert-butyl alcohol and tert-amyl alcohol; nitriles, such as acetonitrile and propionitrile; aliphatic hydrocarbons, such as n-hexane and cyclohexane; aromatic compounds, such as benzene and toluene; and ethers, such as dioxane and diglyme; and water. While these solvents may be satisfactory for manufacturing purposes, many of them have undesirably low flash point temperatures. For whatever reason, it appears that only relatively dilute solutions of cyclohexanone oxime are presently being employed as cyclohexanone oxime delivery systems for use in oil-based coating materials.

A commercially practical cyclohexanone oxime concentrate would include at least about 20 mass percent cyclohexanone oxime as a solute dissolved in a clear solution at room temperature. If the commercially practical cyclohexanone oxime concentrate exhibits any precipitation, phase separation or clouding as a result of temperatures encountered during storage or transportation, the concentrate should recover its original appearance upon return to room temperature.

A desirable cyclohexanone oxime concentrate would exhibit relatively high flash point temperature and a relatively low VOC content. Preferably, the cyclohexanone oxime concentrate will have a flash point temperature of 45 degrees C. or more. Ideally, the flash point of the cyclohexanone oxime concentrate will have a flash point temperature of 60 degrees C., in order to satisfy transportation safety standards in Europe, Canada and the United States.

Accordingly, a need exists for a solvent or system of co-solvents which can be employed for storing and delivering a relatively concentrated solution of cyclohexanone oxime to manufacturers of oil-based coating materials. The ideal solvent may subsequently perform a beneficial role in the manufacturing process. At a minimum, the solvent should remain stable throughout the coating material and should not detract from the quality of the finished coating material.

SUMMARY OF THE INVENTION

It has now been discovered that clear, homogeneous solutions of an anti-skinning agent for oil-based coating materials can be prepared by dissolving cyclohexanone oxime in a suitable fatty acid or mixture of fatty acids. Suitable fatty acids include saturated fatty acids having from about three to about twenty-two carbon atoms per molecule, and unsaturated fatty acids having from about four to about twenty-two carbon atoms per molecule. Surprisingly, these fatty acids and mixtures are useful as delivery solvents over a useful range of temperatures, have desirable flash point temperatures, and are compatible with many oil-based coating materials. The anti-skinning compositions and manufacturing methods of the present invention are especially useful in the production of oil-based paints containing metal carboxylate driers such, for example, cobalt carboxylate, calcium carboxylate and zirconium carboxylate driers.

In one aspect, the invention is an anti-skinning composition for use in an oil-based coating material and comprises cyclohexanone oxime and a fatty acid. The fatty acid is a member of the group of saturated fatty acids having from about three to about twenty-two carbon atoms per molecule or a mixture of these fatty acids. Alternatively, the fatty acid is a member of the group of unsaturated fatty acids having from about four to about twenty-two carbon atoms per molecule or a mixture of these fatty acids. For example, propionic acid and fatty acids of tall oil distillate and mixtures of these acids, with or without rosin acids, may be successfully employed as the fatty acid. The anti-skinning composition may include oleic acid introduced separately as a purified component, introduced as a component of a tall oil distillate, or introduced separately to modify a tall oil distillate.

In another aspect, the invention is an anti-skinning composition for use in an oil-based coating material, which composition comprises a fatty acid and about 20 to about 90 percent mass percent cyclohexanone oxime, based on the total mass of the composition. The composition is a clear, homogeneous solution throughout the temperature range of about 10 to about 30 degrees C. Preferably, the composition includes about 25 to about 70 percent of cyclohexanone oxime; more preferably about 30 to about 60 percent of cyclohexanone oxime. Surprisingly, when frozen and subsequently heated without stirring to a temperature in the range of about 10 to about 30 degrees C., the composition melts to produce a clear, homogeneous solution.

In yet another aspect, the invention is an anti-skinning composition for use in an oil-based coating material. The composition comprises a fatty acid and about 20 to about 90 percent mass percent cyclohexanone oxime; has a flash point of about 45 degrees C. or more; and is a clear, homogeneous solution throughout the temperature range of about 10 to about 30 degrees C. Preferably, the composition has a flash point of about 50 degrees C. or more; more preferably, of 55 degrees C. or more; and most preferably, of 60 degrees C. or more.

In still another aspect, the invention is an anti-skinning composition for use in an oil-based coating material, which composition comprises fatty acids of a tall oil distillate and about 20 to about 90 mass percent cyclohexanone oxime; has a flash point of about 45 degrees C. or more; and is a clear, homogeneous solution throughout the temperature range of about 10 to about 30 degrees C. When frozen and subsequently heated without stirring to a temperature in the range of about 10 to about 30 degrees C., the composition melts to produce a clear, homogeneous solution.

In this aspect, the composition may include about 5 to about 15 mass percent propionic acid, or about 5 to about 15 mass percent oleic acid. The composition may include about 1 to about 30 mass percent rosin acid. Preferably, the composition exhibits anti-skinning performance in the presence of a long oil alkyd paint and one or more metal carboxylate driers that is about equal to or better than the anti-skinning performance exhibited by essentially pure cyclohexanone oxime under the same conditions. Preferably, the composition has a volatile organic carbon-content of about 30 mass percent or less.

In still yet another aspect, the invention is a process for producing an anti-skinning composition for use in an oil-based coating material, which includes combining cyclohexanone oxime and a fatty acid to produce a blend including about 20 to about 90 mass percent of cyclohexane oxime. The blend is stirred at a temperature greater than about 30 degrees C. to produce an anti-skinning composition for use in an oil-based coating material. The composition remains a clear, homogeneous solution throughout the temperature range of about 10 to about 30 degrees C. The invention is also product produced by the process.

These and other aspects of the invention are explained more fully below.

DESCRIPTION OF PREFERRED EMBODIMENTS

Figure 1:
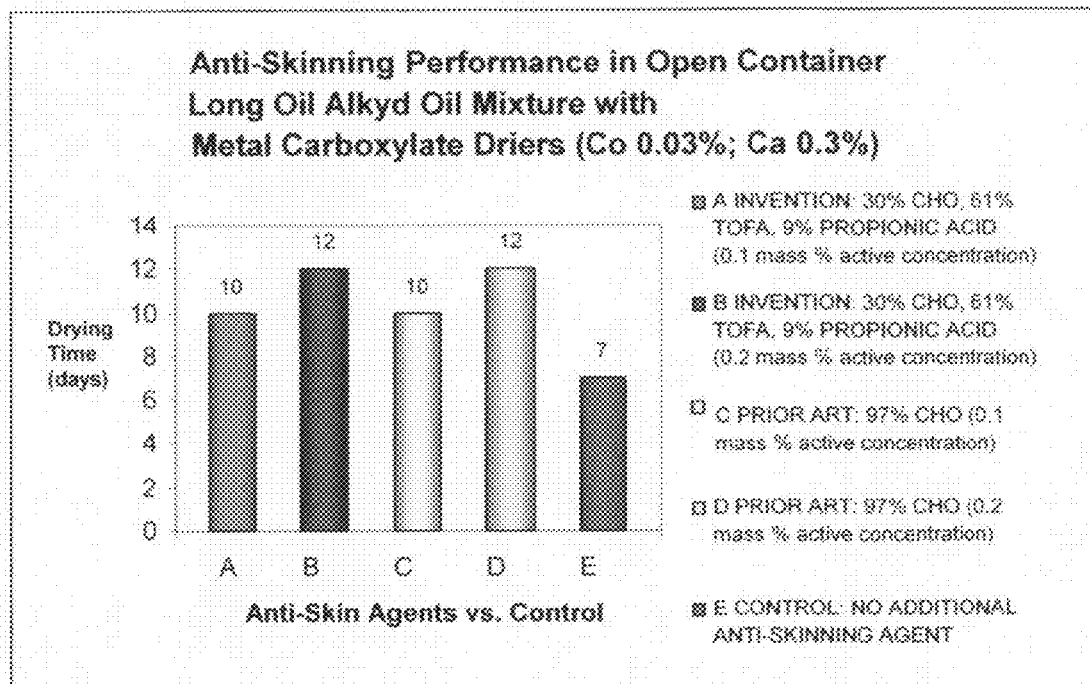
FIG. 1 is a bar graph showing the skin formation time (in days) in an open container for a mixture of long oil alkyds containing 0.03 mass percent cobalt as cobalt carboxylate and 0.3 mass percent calcium as calcium carboxylate drier, to which is added known amounts of various anti-skinning agents.

Applicants have discovered anti-skinning compositions which are suitable for storing cyclohexanone oxime, shipping cyclohexanone oxime, and introducing cyclohexanone oxime into oil-based coating materials in the form of clear and homogeneous solutions. The anti-skinning compositions are stable over relatively broad temperature ranges, have relatively low VOC contents, and exhibit relatively high flash point temperatures. The anti-skinning compositions are especially useful for manufacturing oil-based paints that contain metal carboxylate driers.

The inventive compositions are prepared by combining cyclohexanone oxime with an effective amount of a fatty acid or a mixture of fatty acids. The fatty acids may be, for example, saturated fatty acids having from three to about twenty-two carbon atoms per molecule. Alternatively, the fatty acids may be unsaturated fatty acids having from about four to about twenty-two carbon atoms per molecule. These components are normally rendered transparent by maintaining the composition at a temperature in the range of about 10 to about 55 degrees C. The inventive composition is a clear and homogeneous single phase at room temperature.

"Effective amount" of a fatty acid or a mixture of fatty acids means an amount of the fatty acid or the mixture of fatty acids sufficient to prevent cyclohexanone oxime from precipitating from the solution or forming an additional phase. This will depend, of course, primarily on the concentration of cyclohexanone oxime in the solution. It will also depend on the specific fatty acid or mixture of fatty acids present in the solvent, and whether other adjuvants are added to the solution.

As a general rule, cyclohexanone oxime solutions which are transported or stored at outdoor conditions, without the benefit of dedicated heating or cooling equipment, may be exposed to temperatures in the range of about −8 to about 30 degrees C. Most manufacturing facilities are operated within a narrower range of temperatures, commonly about 10 to about 30 degrees C.

For the present purposes, "fatty acid" means an aliphatic compound having one terminal carboxyl group and three to about twenty-two carbon atoms per molecule. Among other reasons, propionic acid is considered a fatty acid for the present purposes because a) propionic acid can be removed from water by adding sufficient salt to induce formation of an oily phase, and b) propionic acid reacts with potassium to form a salt having soap-like properties.

"Unsaturated fatty acid" means a fatty acid having one or more double bonds in addition to the double bond present in its terminal carboxyl group. "Saturated fatty acid" means a fatty acid having no double bond(s) other than the double bond present in its terminal carboxyl group.

"Anti-skinning composition" means a compound or formulation that may be added to oil based coating materials, such as paints, stains and lacquers, to prevent the formation of skin or lumpy matter on the coating material as a result of oxidation during transportation or storage.

Oxidatively drying coatings based on, for example, drying oils, alkyd resins, epoxy esters are known. These oils and binders crosslink oxidatively under the influence of oxygen (usually atmospheric oxygen) in the presence of catalysts known as driers, such as metal carboxylates of transition metals. If this cross linking takes place before the product is actually used, a solid binder film or "skin" forms. This is highly undesirable since it makes the coating more difficult to apply and can interfere with the uniform distribution of the driers. Among other problems, accumulation of the driers in the skin can extend the drying time of the coating when it is applied to a substrate.

Skinning in the coating film after application is also disadvantageous. Excessively rapid drying of the coating surface can prevent lower coating layers from drying evenly because they are shielded from oxygen by the skin. Undesirable results include flow problems in the coating, adhesion problems, and soft films.

In a preferred embodiment, the invention is an anti-skinning composition which includes cyclohexanone oxime and a mixture of propionic acid and fatty acids of a tall oil distillate. The tall oil distillate may be a commercially available tall oil fatty acid mixture including about 1 mass percent of rosin acids such as, for example, Arizona Chemical Company's Acintol® FA2 or Sylfat® FA2. Alternatively, the tall oil distillate may be a commercially available distilled tall oil mixture including as much as 35 mass percent of rosin acids such as, for example, Arizona Chemical Company's Acintol® D30LR or Union-Camp Corporations's Unitol® DT30. The most commonly encountered of the fatty acids of tall oil distillate is oleic acid, which is often a major component. Others fatty acids of tall oil distillate include linoleic acid and linolenic acid. While rosin acids are often present in tall oil distillate, they are not fatty acids.

In the embodiment, the composition is a clear, homogeneous solution throughout the temperature range of about 10 to about 30 degrees C. and has a flash point temperature of about 45 degrees C. or more; preferably, about 50 degrees C. or more; more preferably, about 55 degrees C. or more; most preferably, about 60 degrees C. or more. The composition, when frozen and subsequently heated without stirring to a temperature in the range of about 10 to about 30 degrees C., melts to produce a clear, homogeneous solution.

Also in the embodiment, cyclohexanone oxime is present in an amount of more than about 25 mass percent; preferably, more than about 30 mass percent; and most preferably more than about 35 mass percent. Relatively higher concentrations of cyclohexanone oxime are desirable for transportation and storage, but may be deleterious to physical stability of the anti-skinning composition over the manufacturing operations range of about 10 to about 30 degrees C.

While not intending to be bound by theory, it is believed that the active anti-skinning ingredient of the inventive composition is cyclohexanone oxime. When an unsaturated fatty acid is present in the inventive composition, it is expected that the unsaturated fatty will participate in oxidative drying reactions that may occur, if any, in a coating which contains the inventive composition. However, partly because the amount of unsaturated fatty acid present is typically small as compared to the amount of the coating, it is believed that the fatty acids of the inventive composition may be regarded as inert components as far as drying time is concerned.

The form of cyclohexanone oxime employed as a raw material for manufacturing the embodiment may be crystals, amorphous powder, flakes or slurry. While technical grade purity is not necessary for the raw material, the effect of any impurities on the performance of the anti-skinning composition must be considered. Skilled practitioners of in the coatings manufacturing industry know which impurities may be tolerated and their likely effects.

Propionic acid is present in the embodiment in an amount of about 5 to about 15 mass percent; preferably, about 10 mass percent. Relatively higher concentrations of propionic acid cyclohexanone tend to enhance the physical stability of the anti-skinning composition, but are associated with greater VOC content. It is usually acceptable for the source of propionic acid employed as a raw material to include relatively minor amounts of other fatty acids.

In another preferred embodiment, the invention is a process for producing the anti-skinning composition described above. In the process, 30 mass percent of cyclohexanone oxime, tall oil distillate, and about 5 to about 15 mass percent of propionic acid are combined to produce a blend. The blend is stirred at a temperature in the range of about 30 to about 55 degrees C. to produce an anti-skinning composition for use in an oil-based coating material. The composition is a clear, homogeneous solution throughout the temperature range of about 10 to about 30 degrees C.

The following Examples are intended to better communicate the invention, and not to limit the scope of the invention in any way.

EXAMPLES

Example 1

Physical Stability of Inventive Mixtures

A number of mixtures are subjected to the following procedure to demonstrate which, if any, are suitable as solvents or co-solvents for cyclohexanone oxime at temperatures of commercial and industrial interest. The procedure identifies those mixtures containing 30 mass percent cyclohexanone oxime that are clear, homogeneous solutions over a useful range of temperature. The procedure also determines which mixtures are subject to freezing at a temperature of interest, and whether those of the mixtures that freeze are capable of melting in the absence of stirring or other externally-induced agitation to produce a clear, homogeneous solution.

In each demonstration, a mixture is prepared by combining 30 g cyclohexanone oxime, X g of a first material of interest and Y g of a second material of interest. In some cases, the mixtures do not include any of the second material and in those cases Y is equal to zero. The mixture is heated (if necessary) to a temperature of 55 degrees C., or until the mixture appears to be a single, clear liquid phase, whichever occurs first. The mixture is permitted to cool to room temperature (in the range of to 22-25 degrees C.) and samples of the cooled mixture are stored at room temperature for 30 days, in a refrigerator at 10 degrees C. for 30 days, or in a freezer at −8 degrees C. for 30 days. The samples are observed for any evidence of precipitation such as settling or clouding. Samples that freeze are placed in a room temperature environment without stirring. Inspection results are presented below in the Table.

TABLE

Properties of 30 mass percent Cyclohexanone Oxime Mixtures

| Cyclohexanone Oxime (mass in grams = 30 g) | First Material of Interest (mass in grams = X) | Second Material of Interest (mass in grams = Y) | Invention or For Comparison | Results at 25° C. | Results at 10° C. | Results at −8° C. |
|---|---|---|---|---|---|---|
| Cyclohexanone Oxime (30 g) | Propionic acid (70 g) | None (0 g) | Invention | Clear and Homogeneous | Clear and Homogeneous | Clear and Homogeneous |
| Cyclohexanone Oxime (30 g) | n-Heptanoic acid (61 g) | Propionic acid (9 g) | Invention | Clear and Homogeneous | Clear and Homogeneous | Clear and Homogeneous |
| Cyclohexanone Oxime (30 g) | n-Nonanoic acid (61 g) | Propionic acid (9 g) | Invention | Clear and Homogeneous | Clear and Homogeneous | Clear and Homogeneous |
| Cyclohexanone Oxime (30 g) | Tall Oil Fatty Acid FA-2[1] (70 g) | None (0 g) | Invention | Cloudy and Partially Insoluble | Cloudy and Partially Insoluble | Cloudy and Partially Insoluble |
| Cyclohexanone Oxime (30 g) | Tall Oil Fatty Acid FA-2 (66 g) | Propionic Acid (4 g) | Invention | Clear and Homogeneous | Frozen and Recovered | Frozen and Recovered |
| Cyclohexanone Oxime (30 g) | Tall Oil Fatty Acid FA-2 (62 g) | Propionic Acid (8 g) | Invention | Clear and Homogeneous | Clear and Homogeneous | Frozen and Recovered |
| Cyclohexanone Oxime (30 g) | Tall Oil Fatty Acid FA-2 (61 g) | Propionic Acid (9 g) | Invention | Clear and Homogeneous | Clear and Homogeneous | Frozen and Recovered |
| Cyclohexanone Oxime (30 g) | Tall Oil Fatty Acid FA-2 (60 g) | Propionic Acid (10 g) | Invention | Clear and Homogeneous | Clear and Homogeneous | Frozen and Recovered |

TABLE-continued

Properties of 30 mass percent Cyclohexanone Oxime Mixtures

| Cyclohexanone Oxime (mass in grams = 30 g) | First Material of Interest (mass in grams = X) | Second Material of Interest (mass in grams = Y) | Invention or For Comparison | Results at 25° C. | Results at 10° C. | Results at −8° C. |
|---|---|---|---|---|---|---|
| Cyclohexanone Oxime (30 g) | Tall Oil Fatty Acid DTO-30[2] (70 g) | None (0 g) | Invention | Non-Homogeneous | Non-Homogeneous | Non-Homogeneous |
| Cyclohexanone Oxime (30 g) | Tall Oil Fatty Acid DTO-30 (66 g) | Propionic Acid (4 g) | Invention | Clear and Homogeneous | Frozen and Recovered | Frozen and Recovered |
| Cyclohexanone Oxime (30 g) | Tall Oil Fatty Acid DTO-30 (62 g) | Propionic Acid (8 g) | Invention | Clear and Homogeneous | Clear and Homogeneous | Frozen and Recovered |
| Cyclohexanone Oxime (30 g) | Tall Oil Fatty Acid DTO-30 (61 g) | Propionic Acid (9 g) | Invention | Clear and Homogeneous | Clear and Homogeneous | Frozen and Recovered |
| Cyclohexanone Oxime (30 g) | Tall Oil Fatty Acid DTO-30 (60 g) | Propionic Acid (10 g) | Invention | Clear and Homogeneous | Clear and Homogeneous | Frozen and Recovered |
| Cyclohexanone Oxime (30 g) | Tall Oil Fatty Acid FA-2 (61 g) | Oleic acid (9 g) | Invention | Clear and Homogeneous | Frozen and Recovered | Frozen and Recovered |
| Cyclohexanone Oxime (30 g) | Tall Oil Fatty Acid Ligrene A (60 g) | Propionic acid (10 g) | Invention | Clear and Homogeneous | Clear and Homogeneous | Frozen and Recovered |
| Cyclohexanone Oxime (30 g) | Tall Oil Fatty Acid L-1A (60 g) | Propionic acid (10 g) | Invention | Clear and Homogeneous | Clear and Homogeneous | Frozen and Recovered |

Legend for Table 1:
[1]"Tall Oil Fatty Acid FA-2" means a tall oil distillate commercially available under the tradename Acintol ® FA2 from Arizona Chemical Company of Jacksonville, Florida, U.S.A., which includes:
Rosin Acids, mass percent <2
Saturated Acids, mass percent 2
Oleic Acid, mass percent 50
Linoleic Acid (Non-conjugated), mass percent 37
Linoleic Acid (Conjugated), mass percent 7
Other Fatty Acids, mass percent
[2]"Tall Oil Fatty Acid DTO-30" means a tall oil distillate commercially available under the tradename Acintol ® D30LR from Arizona Chemical Company, which includes oleic acid, other fatty acids, and approximately 28-32 mass percent rosin acids.
[3]"Tall Oil Fatty Acid Ligrene A" means a tall oil distillate commercially available from Meadwestvaco Corporation which includes oleic acid, other fatty acids having 18 carbon atoms per molecule, and approximately 3 mass percent rosin acids.
[4]"Tall Oil Fatty Acid L-1A" means a tall oil distillate commercially available from Meadwestvaco Corporation which includes oleic acid, other fatty acids having 18 carbon atoms per molecule, and approximately 0-3 mass percent rosin acids.

The data in Table 1 indicates that certain mixtures containing 30 mass percent of cyclohexanone oxime are clear, homogeneous solutions that are physically stable over a useful range of temperature. Additionally, the data indicates that some of the mixtures can be frozen and melted without stirring to produce clear, homogeneous solutions.

Example 2

30 g Cyclohexanone Oxime/61 g Tall Oil Fatty Acid FA-2/9 g Propionic Acid a) A composition of the invention is prepared by this procedure. 61 g of Tall Oil Fatty Acid FA-2 (which is a tall oil distillate commercially available under the tradename Acintol® FA2 from Arizona Chemical Company of Jacksonville, Fla., U.S.A.) is combined with 9 g of propionic acid (99.5 mass percent purity, commercially available from Sigma Aldrich Company of Milwaukee, Wis., U.S.A), and 30 g of cyclohexanone oxime (97 mass percent purity, commercially available from Sigma Aldrich) at room temperature and is heated to 55° C. with stirring until a clear and homogeneous anti-skinning composition is formed. The composition is designated 2A for the present purposes.

b) A closed cup flash point determination is conducted in Accordance with Association for Testing and Materials test method ASTM D3278-96. The flashpoint of composition 2A is measured as 62 degrees C.

c) VOC content of composition 2A is determined by difference using a procedure in accordance with Association for Testing and Materials test method ASTM D2369-98, entitled "Test Method for Non-Volatile Content of Coatings". In the procedure, a sample of the composition of interest is precisely weighed and an aluminum foil dish containing the sample is maintained in an oven for 60 minutes at temperatures within 5 degrees of 110 C. The sample is cooled and weighed any loss of mass interpreted as loss of volatile organic carbon material. The loss of mass for a sample of composition 2A is determined to be 28%, which is interpreted as 28% VOC content for composition 2A.

Example 3

30 g Cyclohexanone Oxime/61 g Tall Oil Distillate DT-30/9 g Propionic Acid a) A composition of the invention is prepared by this procedure. 61 g of Tall Oil Fatty Acid DTO-30 (which is a tall oil distillate commercially available under the tradename Acintol® D30LR from Arizona Chemical Company) is combined with 9 g of propionic acid (99.5 mass percent purity, commercially available from Sigma Aldrich Company), and 30 g of cyclohexanone oxime (97 mass percent purity, commercially available from Sigma Aldrich) at room temperature and is heated to 55° C. with stirring until a clear and homogeneous anti-skinning composition is formed. The composition is designated 2B for the present purposes.

b) A closed cup flash point determination is conducted in accordance with Association for Testing and Materials test method ASTM D3278-96. The flashpoint for composition 2B is measured as 58-59 C.

c) VOC content of composition 2B is determined by difference using a procedure in accordance with Association for Testing and Materials test method ASTM D2369-98, entitled "Test Method for Non-Volatile Content of Coatings". The loss of mass for a sample of composition 2B is determined to be 32%, which is interpreted as 32% VOC content for composition 2B.

Example 4

Anti-Skinning Performance in Alkyd Mixture with Low Cobalt/High Calcium Drier

A procedure is performed to demonstrate the effectiveness of a cyclohexanone oxime anti-skinning composition of the invention against skin formation in a representative long oil alkyd mixture which includes a low cobalt/high calcium drier. The anti-skinning composition of the invention is composed of 30 mass percent cyclohexanone oxime, of 61 mass percent Tall Oil Fatty Acid FA-2, and of 9 mass percent propionic acid, and is prepared by the process set forth above in Example 2.

For the purposes of this procedure, anti-skinning performance is defined as the number of days at which skin formation is first observed in an open, half-full container at room temperature for the anti-skinning agent of interest divided by the number of days at which skin formation is first observed at the same conditions for the control mixture (to which no anti-skinning agent is added). In Examples 4 through 7, "long oil alkyd mixture" means a mixture prepared by blending 50 mass percent of a long oil alkyd which is commercially available under the trade name "T&W 300-70" from Deltech Resins Company of Newark, N.J., U.S.A.; 12.5 mass percent of Raw Linseed Oil which is commercially available from Welch, Holme & Clark Co., Inc. of Newark, N.J., U.S.A; and 37.5 mass percent of a de-aromatized, aliphatic hydrocarbon fluid which is commercially available under the tradename Exxsol™ D40 from ExxonMobil Chemical Company of Houston, Tex., U.S.A. The results of this procedure are presented in FIG. 1.

The long oil alkyd mixture also includes 0.03 mass percent of cobalt, which is introduced as cobalt carboxylate, and 0.3 mass percent of calcium, which is introduced as calcium carboxylate. Skin formation is detected by visual inspection, and anti-skiing effectiveness is assessed relative to that exhibited by essentially pure cyclohexanone under the same conditions and at the same active concentrations. A control test is also performed employing the long oil alkyd mixture and the same driers, except without adding any anti-skinning agent.

By definition, the performance of the control mixture (with no additional anti-skinning agent) is 100%. Inspection of FIG. 1 reveals that the control mixture first exhibits skin formation at 7 days in the open container. In contrast, a mixture which includes the anti-skinning composition of the invention at an active ingredient concentration of 0.1 mass percent does not exhibit skin formation until 10 days. This data indicates that the anti-skinning performance of the anti-skinning composition of the invention is 143% at 0.1 mass percent active concentration in the long oil alkyd mixture with low cobalt/high calcium drier.

Turning again to FIG. 1, it is apparent that a mixture which includes the essentially pure cyclohexanone oxime as anti-skinning agent at 0.1 mass percent active concentration also exhibits skin formation at 10 days.

The bar chart of FIG. 1 shows that a mixture which includes the anti-skinning composition of the invention at an active ingredient concentration of 0.2 mass percent exhibits skin formation until 12 days. This is 171% anti-skinning performance. A mixture which includes the essentially pure cyclohexanone oxime as anti-skinning agent at 0.2 mass percent active concentration also exhibits skin formation at 12 days. One may conclude from the data of FIG. 1 that the anti-skinning composition of the invention and that of essentially pure cyclohexanone oxime exhibit about the same performance for similar active ingredient concentrations in the long oil alkyd mixture with a low cobalt/high calcium drier.

Example 5

Anti-Skinning Performance in Alkyd Mixture with High Cobalt/Low Calcium Drier

A procedure is performed to demonstrate the effectiveness of a cyclohexanone oxime anti-skinning composition of the invention against skin formation in a representative long oil alkyd mixture which includes a high cobalt/low calcium drier. The anti-skinning composition of the invention has the composition described above in Example 4.

The long oil alkyd mixture has the composition described above in Example 4, except that it includes 0.06 mass percent cobalt as cobalt carboxylate drier, rather than 0.03 mass percent cobalt, and includes 0.1 mass percent calcium as calcium carboxylate drier, rather than 0.3 mass percent calcium. Skin formation is detected by visual inspection, and anti-skinning effectiveness is assessed relative to that exhibited by essentially pure cyclohexanone under the same conditions. A control test is also performed employing the long oil alkyd mixture, except without any added anti-skinning agent.

Anti-skinning performance is again defined as the number of days at which skin formation is first observed in an open, half-full container at room temperature for the anti-skinning composition of interest divided by the number of days at which skin formation is first observed at the same conditions for the control mixture (which contains no anti-skinning agent). The results of this procedure are presented in FIG. 2.

By definition, the performance of the control mixture (with no anti-skinning agent) is 100%. Inspection of FIG. 2 reveals that the control mixture exhibits skin formation after 7 days in the open container. In contrast, a mixture which includes the anti-skinning composition of the invention at an active ingredient concentration of 0.1 mass percent does not exhibit skin formation until 10 days. This difference indicates anti-skinning performance of 143% for the anti-skinning composition of the invention at 0.1 mass percent active concentration.

Turning again to FIG. 2, it is apparent that a mixture which includes the essentially pure cyclohexanone oxime as anti-skinning agent at 0.1 mass percent active concentration exhibits skin formation at 9 days.

Figure 2:
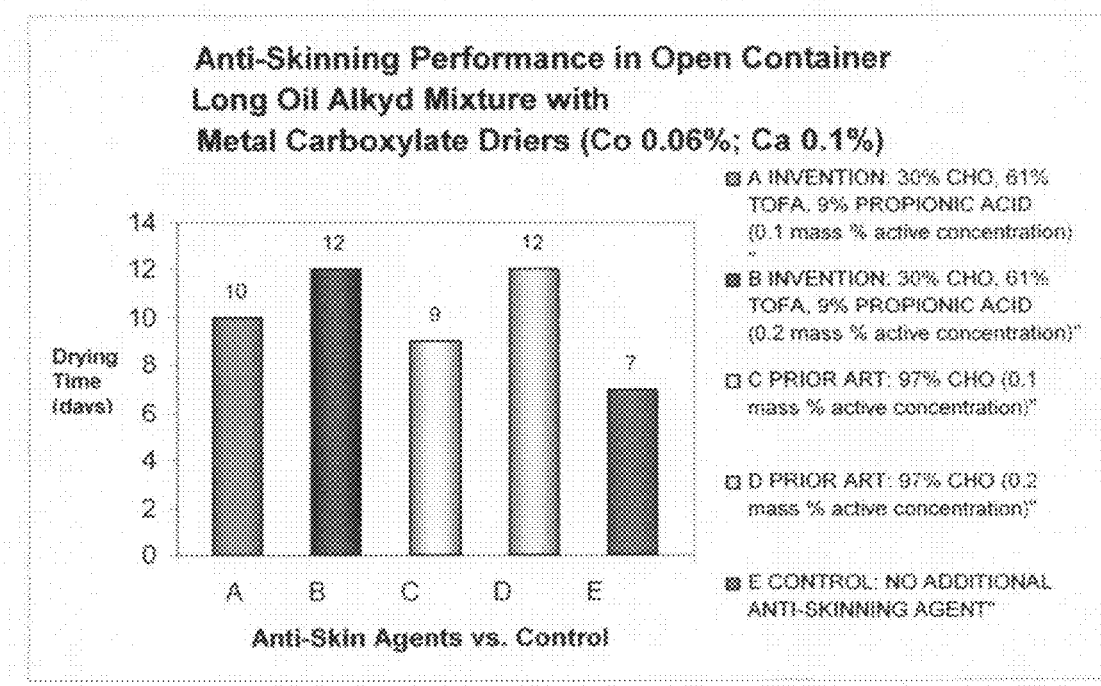
FIG. 2 is a bar graph showing the skin formation time (in days) in an open container for a mixture of long oil alkyds containing 0.06 mass percent cobalt as cobalt carboxylate and 0.1 mass percent calcium as calcium carboxylate, to which is added known amounts of various anti-skinning agents.

The bar chart of FIG. 2 additionally demonstrates that a mixture which includes the anti-skinning composition of the invention at an active ingredient concentration of 0.2 mass percent exhibits skin formation at 12 days. This is 171% anti-skinning performance. A mixture which includes the essentially pure cyclohexanone oxime as anti-skinning agent at 0.2 mass percent active concentration also exhibits skin formation at 12 days. One may conclude from the data of FIG. 2 that the anti-skinning composition of the invention and that of essentially pure cyclohexanone oxime exhibit about the same performance at similar active ingredient concentrations in the long oil alkyd mixture with a high cobalt/low calcium drier.

Example 6

Drying Time of Alkyd Mixture with Various Anti-Skinning Agents and Low Cobalt/High Calcium Drier A procedure is performed to demonstrate that use of a cyclohexanone oxime anti-skinning composition of the invention in the oil alkyd mixture with a low cobalt/high calcium drier has about the same effect on drying time as does essentially pure cyclohexanone oxime in the oil alkyd mixture with the same drier. The anti-skinning composition of the invention has the composition described above in Example 4.

The long oil alkyd mixture has the composition described above in Example 4, including 0.03 mass percent cobalt as cobalt carboxylate and 0.3 mass percent calcium as calcium carboxylate. Drying time is investigated for mixtures with the anti-skinning composition of the invention, and for mixtures having essentially pure cyclohexanone oxime for anti-skinning protection. A control test is also performed employing the long oil alkyd mixture, except without any additional anti-skinning agent.

Drying time for each mixture is determined by means of a circular drying time recorder, of the type commercially available from BYK-USA of Wallingford, Conn., U.S.A. Each measurement involves making a drawdown with a bar film applicator. The results of this procedure are presented in FIG. 3.

Figure 3:
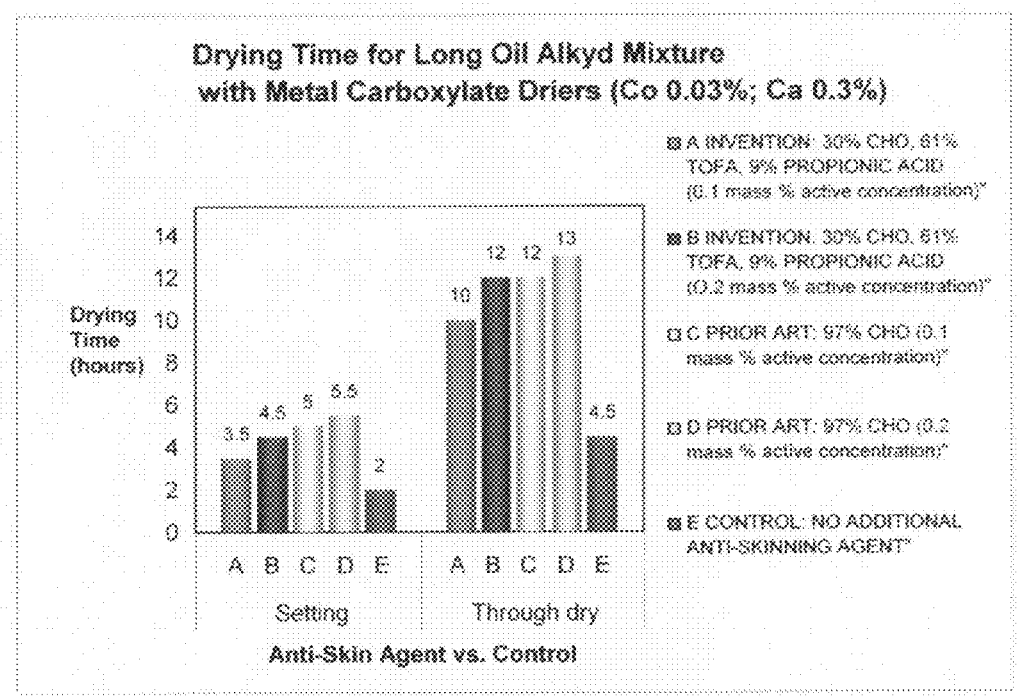
FIG. 3 is a bar graph showing the drying time (in hours) for a mixture of long oil alkyds containing 0.03 mass percent cobalt as cobalt carboxylate and 0.3 mass percent calcium as calcium carboxylate, to which is added known amounts of various anti-skinning agents.

Inspection of FIG. 3 reveals that the control mixture sets at about 2 hours, and thoroughly dries at about 4.5 hours. By way of comparison, a mixture which includes the anti-skinning composition of the invention at an active ingredient concentration of 0.1 mass percent sets at 3.5 hours, and thoroughly dries at 10 hours. This is about the same (or slightly less than) a mixture including 0.1 mass percent of essentially pure cyclohexanone, which sets in 5 hours and thoroughly dries in 12 hours.

FIG. 3 also demonstrates that a mixture which includes the anti-skinning composition of the invention at an active ingredient concentration of 0.2 mass percent sets at 4.5 hours, and thoroughly dries at 12 hours. This drying time is similar to that of a mixture which includes essentially pure cyclohexanone oxime at 0.2 mass percent active concentration, setting at 5.5 hours and thoroughly drying at 13 hours. One may conclude that drying times with the anti-skinning composition of the invention and with essentially pure cyclohexanone oxime, at similar active ingredient concentrations in the long oil alkyd mixture and a low cobalt/high calcium drier, are about the same.

Example 7

Drying Time of Alkyd Mixture with Various Anti-Skinning Agents and High Cobalt/Low Calcium Drier A procedure is performed to demonstrate that use of a cyclohexanone oxime anti-skinning composition of the invention in the long oil alkyd mixture with a high cobalt/low calcium drier has about the same effect on drying time as that of essentially pure cyclohexanone oxime in the long oil alkyd mixture with the same drier. The anti-skinning composition of the invention has the composition described above in Example 4.

The long oil alkyd mixture has the composition described above in Example 4 except that it includes 0.06 mass percent cobalt carboxylate drier, rather than 0.03 mass percent cobalt carboxylate drier, and includes 0.1 mass percent calcium carboxylate drier, rather than 0.3 mass percent calcium carboxylate drier. Drying time is investigated for mixtures with the anti-skinning composition of the invention, and for mixtures having essentially pure cyclohexanone oxime for anti-skinning protection. A control test is performed employing the long oil alkyd mixture, except without any additional anti-skinning agent. Drying time for each mixture is determined by means of a circular drying time recorder, of the type commercially available from BYK-USA of Wallingford, Conn., U.S.A.

Figure 4:
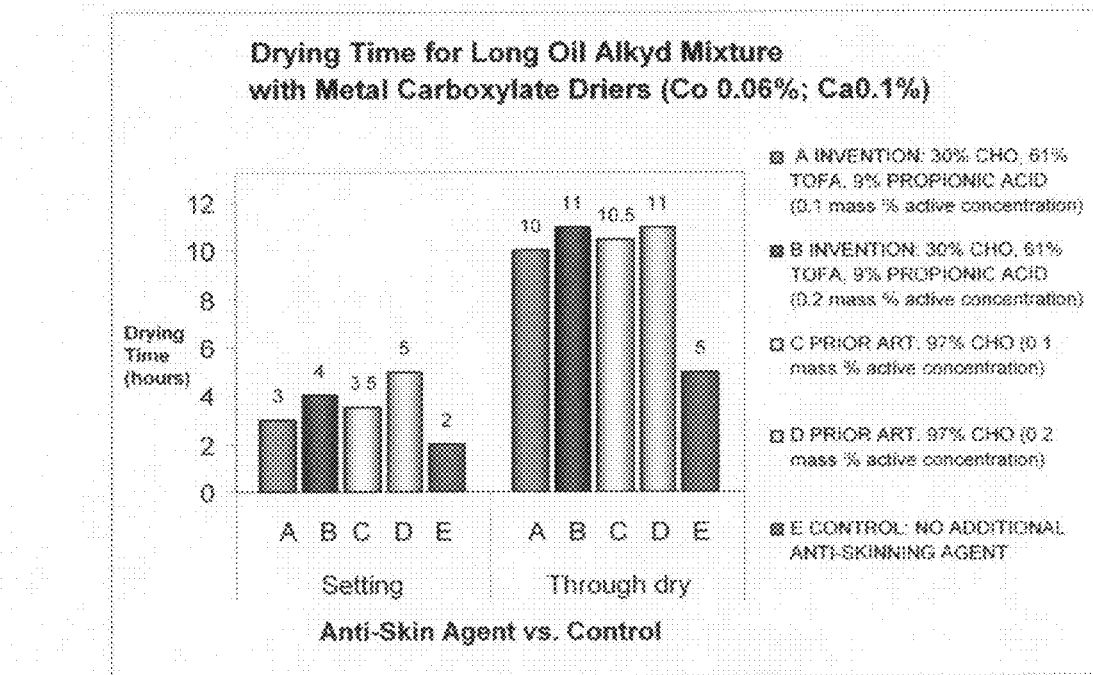
FIG. 4 is a bar graph showing the drying time (in hours) for a mixture of long oil alkyds containing 0.06 mass percent cobalt as cobalt carboxylate and 0.1 mass percent calcium as calcium carboxylate drier, to which is added known amounts of various anti-skinning agents.

Inspection of FIG. 4 reveals that the control mixture sets at about 2 hours, and thoroughly dries at 5 hours. By way of comparison, a mixture which includes the anti-skinning agent of the invention at an active ingredient concentration of 0.1 mass percent sets at 3 hours, and thoroughly dries at 10 hours. This is about the same (or slightly less) than for a mixture including 0.1 mass percent of essentially pure cyclohexanone oxime, which sets in 3.5 hours and thoroughly dries in 10.5 hours.

FIG. 4 also demonstrates that a mixture which includes the anti-skinning composition of the invention at an active ingredient concentration of 0.2 mass percent sets at 4 hours, and thoroughly dries at 11 hours. This drying time is similar to that of a mixture which includes essentially pure cyclohexanone oxime at 0.2 mass percent active concentration, setting at 5 hours and thoroughly drying at 11 hours. One may conclude that drying times with the anti-skinning composition of the invention and with that of essentially pure cyclohexanone oxime, at the same active ingredient concentrations in the long oil alkyd mixture with high cobalt/low calcium drier, are about the same.

The above Examples are not intended to limit the present invention in any way. The present invention is defined by the appended claims.

We claim as our invention:

1. An anti-skinning composition for use in an oil-based coating material, which composition comprises:
    about 20 to about 60 percent mass percent cyclohexanone oxime;
    about 5 to about 15 mass percent propionic acid; and
    about 5 to about 33 mass percent oleic acid, based on the total mass of the composition.

2. An oil-based coating material which includes the composition of claim 1.

3. An anti-skinning composition for use in an oil-based coating material, which composition comprises:
    about 5 to about 15 mass percent propionic acid:
    about 5 to about 33 mass percent oleic acid; and
    about 20 to about 60 percent mass percent cyclohexanone oxime, based on the total mass of the composition; and
    which composition is a clear, homogeneous solution throughout the temperature range of about 10 to about 30 degrees Centigrade.

4. The composition of claim 3 in which the mass of the cyclohexanone oxime is about 25 to about 60 percent, based on the total mass of the composition.

5. The composition of claim 4 in which the mass of the cyclohexanone oxime is about 30 to about 60 percent, based on the total mass of the composition.

6. The composition of claim 3, which when frozen and subsequently heated without stirring to a temperature in the range of about 10 to about 30 degrees C., melts to produce a clear, homogeneous solution.

7. An anti-skinning composition for use in an oil-based coating material, which composition comprises:
about 5 to about 15 mass percent propionic acid;
about 5 to about 33 mass percent oleic acid;
and about 20 to about 60 percent mass percent cyclohexanone oxime, based on the total mass of the composition; and
which composition has a flash point of about 45 degrees C. or more; and
which composition is a clear, homogeneous solution throughout the temperature range of about 10 to about 30 degrees C.

8. The composition of claim 7 which has a flash point of about 50 degrees C. or more.

9. The composition of claim 8 which has a flash point of about 55 degrees C. or more.

10. The composition of claim 9 which has a flash point of about 60 degrees C. or more.

11. An anti-skinning composition for use in an oil-based coating material, which composition comprises:
about 5 to about 15 mass percent propionic acid;
about 5 to about 33 mass percent oleic acid;
about 26 to about 29 mass percent linoleic acid;
and about 20 to about 30 mass percent cyclohexanone oxime, based on the total mass of the composition;
which composition has a flash point of about 45 degrees C. or more;
which composition is a clear, homogeneous solution throughout the temperature range of about 10 to about 30 degrees Centigrade; and
which composition, when frozen and subsequently heated without stirring to a temperature in the range of about 10 to about 30 degrees C., melts to produce a clear, homogeneous solution.

12. The composition of claim 11, which includes about 1 to about 20 mass percent rosin acid, based on the total mass of the composition.

13. The composition of claim 11, which exhibits anti-skinning performance in the presence of an alkyd paint having a cobalt carboxylate drier and a calcium carboxylate drier.

14. The composition of claim 11, which has a volatile organic carbon content of about 30 mass percent or less.

15. A process for producing an anti-skinning composition for use in an oil-based coating material, which process comprises:
combining cyclohexanone oxime, 5 to about 33 mass percent oleic acid, and about 5 to about 15 mass percent propionic acid to produce a blend including about 20 to about 60 mass percent of cyclohexanone oxime;
stirring the blend at a temperature greater than about 30 degrees C. to produce an anti-skinning composition for use in an oil-based coating material; and
which composition remains a clear, homogeneous solution throughout the temperature range of about 10 to about 30 degrees C.

* * * * *